US005151712A

United States Patent [19]

Arahara et al.

[11] Patent Number: 5,151,712

[45] Date of Patent: Sep. 29, 1992

[54] METHOD OF TRANSFERRING VISCOUS SUBSTANCE BY APPLYING PLURAL VOLTAGES TO REDUCE ITS ADHESIVENESS

[75] Inventors: Kohzoh Arahara, Kawasaki; Toshiya Yuasa, Mitaka; Takashi Kai, Hadano; Noboru Tohyama, Kawasaki; Akihiro Mouri, Atsugi; Kenichi Matsumoto, Tokyo, all of Japan

[73] Assignee: Canon Kabushiki Kaisha, Tokyo, Japan

[21] Appl. No.: 527,178

[22] Filed: May 23, 1990

[30] Foreign Application Priority Data

May 24, 1989 [JP] Japan .................................. 1-128763
Jun. 7, 1989 [JP] Japan .................................. 1-142898

[51] Int. Cl.[5] ........................ B41J 2/005; G01D 15/16

[52] U.S. Cl. ................................ 346/1.1; 346/140 R; 101/450.1; 101/465; 101/466; 101/489; 101/DIG. 37

[58] Field of Search ............................ 346/1.1, 140 R; 101/463.1, 465, 466, 489, 491, 492, DIG. 37

[56] References Cited

U.S. PATENT DOCUMENTS

| | | | |
|---|---|---|---|
| 4,368,669 | 1/1983 | Love | 346/140 R |
| 4,838,940 | 6/1989 | Kan et al. | 106/22 |
| 4,920,361 | 4/1990 | Arahara et al. | 346/140 R |
| 4,972,200 | 11/1990 | Arahara | 346/140 R |
| 5,032,849 | 7/1991 | Arahara et al. | 346/1.1 |

FOREIGN PATENT DOCUMENTS

| | | |
|---|---|---|
| 0078018 | 5/1983 | European Pat. Off. . |
| 0392826 | 10/1990 | European Pat. Off. . |
| 2601900 | 1/1988 | France . |
| 63-30279 | 2/1988 | Japan . |

*Primary Examiner*—Benjamin R. Fuller
*Assistant Examiner*—Scott A. Rogers
*Attorney, Agent, or Firm*—Fitzpatrick, Cella, Harper & Scinto

[57] ABSTRACT

A method for transferring a viscous substance, including the steps of: providing a viscous substance capable of changing its adhesiveness corresponding to the polarity of a voltage applied thereto; disposing the viscous substance between a first electrode and a second electrode; and applying a voltage to the viscous substance plural times, thereby to reduce the adhesiveness of the viscous substance to the first electrode.

12 Claims, 4 Drawing Sheets

METHOD OF TRANSFERRING VISCOUS SUBSTANCE BY APPLYING PLURAL VOLTAGES TO REDUCE ITS ADHESIVENESS

FIELD OF THE INVENTION AND RELATED ART

The present invention relates to a method of transferring a viscous substance and an image forming method utilizing such a transfer method.

Hitherto, in a case where a viscous substance such as printing ink, adhesive and pudding is transferred or moved in a chemical plant, etc., the viscous substance is transferred by scooping it with a container, by applying a pressure thereto to be moved in a pipe, or by causing it to successively adhere to the surfaces of plural rotating rollers.

However, these conventional methods have various disadvantages such that the viscous substance to be transferred adheres to the container or roller surface causing a loss thereof, or it si difficult to remove the viscous substance attached to the container or roller.

From such viewpoints our research group has proposed a transfer method wherein the viscous substance is subjected to transfer operation without a loss thereof by applying a voltage to the viscous substance (U.S. Pat. Application Ser. No. 416,488).

The technique using such a viscous substance may for example include printing. Our research group has proposed a printing process wherein a voltage is applied to an ink so as to change its adhesiveness, whereby a recording is effected (U.S. Pat. Application Ser. No. 301,146 filed Jan. 25, 1989, now abandoned. Our research group has also proposed a printing process wherein an ink remaining in the device used therefor is easily removed (U.S. Pat. No. 4,972,200 issued Nov. 20,1990. Our research group has further proposed a printing method wherein a voltage is applied to an ink while the physical property of the ink is not substantially changed even for a long printing time (Japanese Patent Application Nos. 90827/1989, 122749/1989 and 190947/1989).

SUMMARY OF THE INVENTION

An object of the present invention is to provide a method of transferring a viscous substance at a high transfer speed wherein the viscous substance is transferred without a loss thereof and the removal of the viscous substance attached to a member used therefor may be omitted.

Another object of the present invention is to provide an image forming method and an image forming apparatus which are capable of providing recorded images at a high image formation speed by utilizing the above-mentioned transfer method.

According to the present invention, a method is provided for transferring a viscous substance, comprising the steps of:

(a) providing a viscous substance capable of changing its adhesiveness corresponding to the polarity of a voltage applied thereto;

(b) disposing the viscous substance between a first electrode and a second electrode; and (c) applying a voltage to the viscous substance plural times, thereby to reduce the adhesiveness of the viscous substance to the first electrode.

The present invention also provides an image forming method comprising the steps of:

providing a recording material capable of changing its adhesiveness corresponding to the polarity of a voltage applied thereto;

supplying the recording material between a pair of electrodes at least one of which has a pattern comprising an electroconductive portion and an insulating portion; and applying a voltage plural times to the recording material thereby to attach the recording material to the electrode having the pattern corresponding to the pattern thereof.

The present invention further provides an image forming apparatus, comprising:

a pair of electrodes at least one of which has a pattern comprising an electroconductive portion and an insulating portion;

at least one auxiliary electrode disposed opposite to the electrode having the pattern;

means for supplying a recording material between the pair of electrodes;

means for applying a voltage between the pair of electrodes;

means for applying a voltage between the auxiliary electrode and the electrode having the pattern; and pressure application means for transferring to a transfer-receiving medium the recording material attached to the electrode having the pattern corresponding to the pattern thereof under application of the voltage.

These and other objects, features and advantages of the present invention will become more apparent upon consideration of the following description of the preferred embodiments of the present invention taken in conjunction with the accompanying drawings.

DETAILED DESCRIPTION OF THE INVENTION

The viscous substance-transferring method according to the present invention utilizes a phenomenon such that when a voltage is applied to a viscous substance reduces its adhesiveness to one of the pair of electrodes. Further, the present invention is based on a property of the viscous substance such that a decrease in the adhesiveness (or non-adhesiveness) of the viscous substance may occur when a current is passed through the viscous substance and the total charge amount flowing through the viscous substance exceeds a predetermined charge amount. According to our investigation, it is considered that the adhesion between the viscous substance and the electrode is gradually (or stepwise) changed and the resultant adhesion exceeds a predetermined value at a certain charge amount.

In other words, the present invention utilizes a phenomenon such that when a voltage is applied to a viscous substance a plural number of times, the viscous substance first loses its adhesiveness to one electrode at the time of certain number of voltage applications.

Hereinbelow, the present invention is specifically described with reference to the accompanying drawings.

Figure 1:
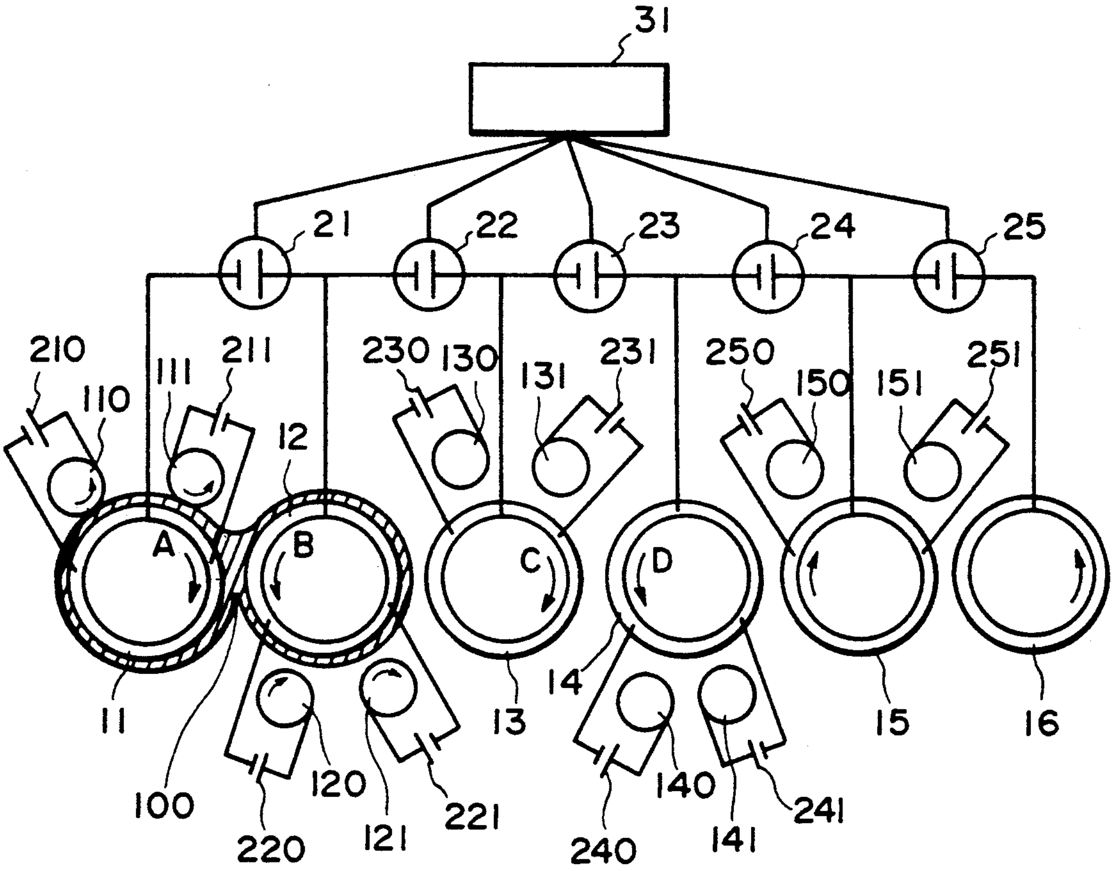
FIGS. 1 to 3 are schematic side sectional views for illustrating an embodiment of the viscous substance-transferring method according to the present invention.

Referring to FIG. 1, in the viscous substance-transferring method according to the present invention, a viscous substance 100 may successively be transferred from a roller 11 to rollers 12 through 16.

Referring to FIG. 1, a viscous substance 100 is first supplied between a first roller 11 rotating in the arrow A direction and a second roller 12 rotating in the arrow B direction. Each of the first roller 11 to the sixth roller 16 shown in FIG. 1 functions as an electrode, and power supplies 21–25 are provided so that a voltage is applied between each pair of the adjacent rollers.

Further, along with the peripheral surface of each of the first roller 11 to fifth roller 15, pairs of auxiliary rollers 110 and 111, 120 and 121, 130 and 131, 140 and 141, and 150 and 151, as auxiliary electrodes, are respectively disposed movably so that the distances between these auxiliary rollers and the rollers 11 to 15 are respectively variable. Each of the auxiliary rollers 110 to 151 shown in FIG. 1 functions as an electrode, and power supplies 210, 211, 220, 221, 230, 231, 240, 241, 250 and 251 are provided so that a voltage is applied to each of the auxiliary rollers.

Figure 2:
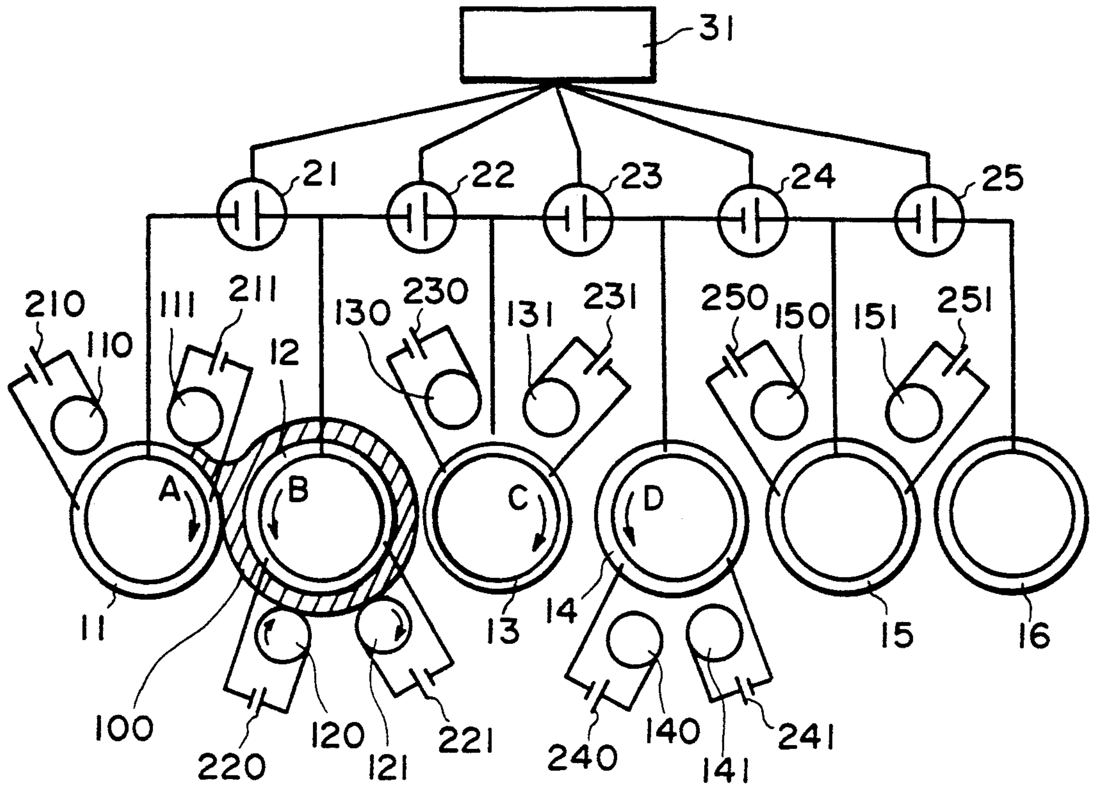

Referring to FIG. 1, when the power supplies 21, 210 and 211 are turned on by means of a power supply controller 31, the first roller 11 becomes a cathode and the second roller 12 and the auxiliary rollers 110 and 111 become anodes, and simultaneously, the auxiliary rollers 110 and 111 are moved toward the first roller 11 so that they contact the viscous substance (layer) 100 disposed on the first roller 11. Along with the rotation of the first roller 11, the viscous substance 100 disposed on the first roller 11 is first supplied with a voltage between the first roller 11 and the auxiliary roller 110, then supplied with a voltage between the first roller 11 and the auxiliary roller 111, and finally supplied with a voltage between the first roller 11 and the second roller 12, whereby the adhesiveness of the viscous substance 100 is decreased on the first roller 11 side. Accordingly, as shown in FIG. 2, the viscous substance 100 is selectively attached to the second roller 12. After the entire amount of the viscous substance 100 is substantially transferred (or moved) to the second roller 12, the auxiliary rollers 110 and 111 are moved so that they become more distant from the first roller 11.

As described hereinabove, the viscous substance used in the present invention may have a property such that when the total amount of electric charges passing through the viscous substance exceeds a predetermined charge amount, the viscous substance decreases its adhesiveness. In an embodiment as shown in FIG. 2, when the viscous substance 100 is supplied with a voltage between the first roller 11 and the second roller 12 by means of the power supply 21 after the voltage applications thereto based on each of the auxiliary rollers 110 and 111, the total amount of electric charges passing through the viscous substance 100 exceeds a predetermined charge amount.

Figure 3:
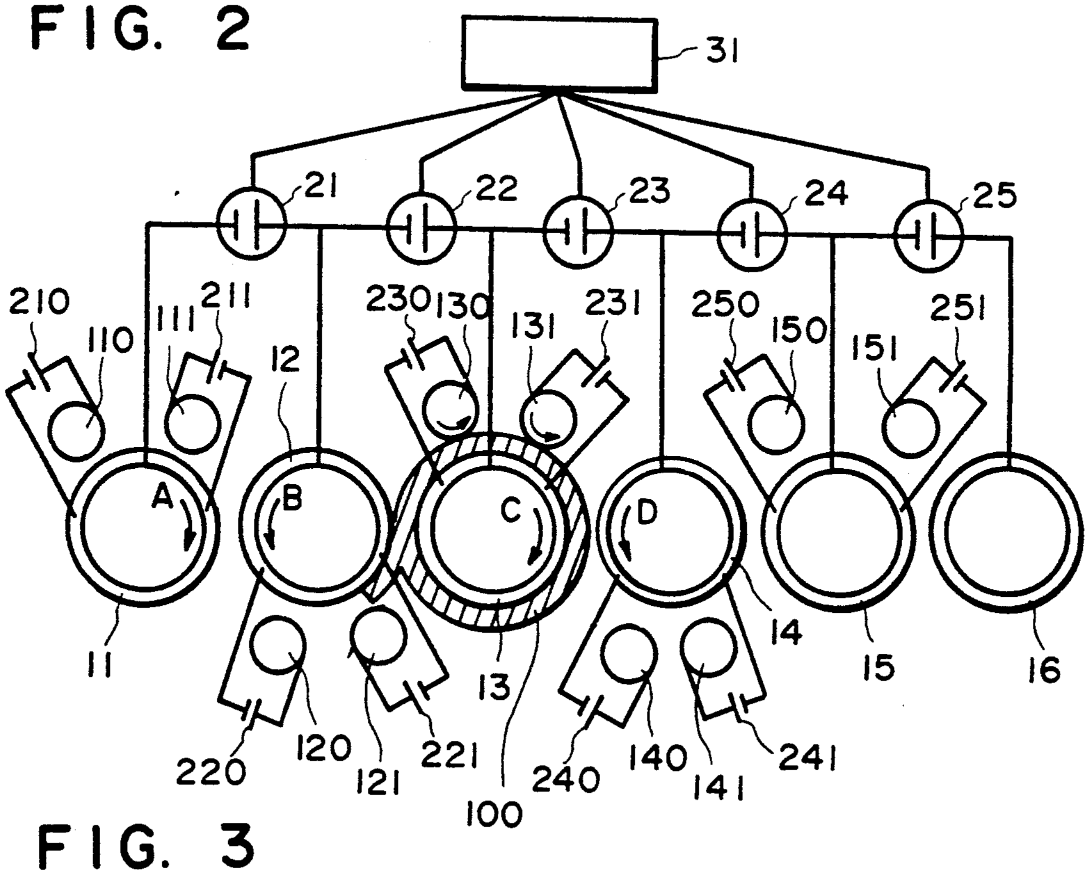

Thereafter, the viscous substance 100 disposed on the second roller 12 is separated from the first roller 11 while the application of the voltage based on the power supply 21 is continued, and the viscous substance 100 disposed on the second roller 12 is caused to contact a third roller 13 rotating in the arrow C direction. Further, when power supplies 22, 220 and 221 are turned on by means of the power supply controller 31 and a voltage is applied between the second roller 12 as a cathode and the third roller 13 as an anode, and between the second roller 12 and auxiliary rollers 120 and 121 as anodes, and the auxiliary rollers 120 and 121 are moved toward the second roller 12 so that they contact the viscous substance 100 disposed on the second roller 12, the adhesiveness of the viscous substance 100 is reduced on the second roller 12 side as shown in FIG. 3, whereby the viscous substance 100 is transferred onto the third roller 13.

Then, the viscous substance 100 attached to the third roller 13 is separated from the second roller 12, and is caused to contact a fourth roller 14 rotating in the arrow D direction.

Further, when the above-mentioned operations are repeated in a similar manner, the viscous substance 100 is finally transferred to a sixth roller 16.

As described above, in a case where voltage application to a viscous substance is repeated a plural number of times so as to decrease the adhesiveness of the viscous substance, a predetermined amount of charges may be passed through the viscous substance, even when a period of time corresponding to one voltage application becomes short. As a result, the speed or velocity of the viscous substance transfer may be increased.

The voltage to be applied between the above-mentioned respective electrodes may preferably be a DC voltage of 3–50 V, more preferably 5–40 V. If the voltage is lower than 3 V, the change from an adhesive state to a non-adhesive state may be insufficient. If the voltage is higher than 50 V, the power consumption may be undesirably large.

In another embodiment of the present invention, it is possible to provide the above-mentioned auxiliary rollers 110, 111, 120, 121, 130, 131, 140, 141, 150 and 151 so that the clearances or gaps between the auxiliary rollers and the rollers 11 to 15 become constant, but the auxiliary rollers are not movable toward the rollers 11 to 15. In such an embodiment, in order to cause each auxiliary roller to sufficiently contact the viscous substance 100, it is preferred to dispose the auxiliary rollers 110 to 151 so that the clearances between these auxiliary rollers and the rollers 11 to 16, respectively, are gradually decreased along the direction of the the viscous substance transfer, e.g., the clearance between the first roller 11 and the auxiliary roller 111 is smaller than the clearance between the first roller 11 and the auxiliary roller 110. With respect to the first roller 11 to sixth roller 16, the clearance or gap between each pair of adjacent rollers may be either constant or variable.

For example, in a case where substantially the whole amount of a viscous substance disposed between first and second electrodes is transferred once to the second electrode, and thereafter the viscous substance is transferred to a third electrode disposed adjacent to the second electrode, it is preferred that at least the clearance between the second and third electrodes is variable. More specifically, it is preferred to control the clearance between the second and third electrodes so that substantially the whole amount of the viscous substance is transferred once to the second electrode (at this time, the viscous substance disposed on the second electrode does not contact the third electrode), and then the viscous substance disposed on the second electrode is caused to contact the third electrode.

The total amount of electric charges passing through a viscous substance to cause a decrease in the adhesiveness of the viscous substance may vary depending on the property of the viscous substance, material or surface characteristics of a roller to be used in combination with the viscous substance, etc., but may be considered as about 0.1–0.3 coulomb/$cm^2$.

In the above-mentioned embodiment shown in FIGS. 1 to 3, the adhesiveness of a viscous substance is reduced corresponding to three voltage applications. However, it is possible that the adhesiveness of the viscous substance is reduced corresponding to two or at least four voltage applications. When the number of voltage applications becomes larger, an apparatus used therefor may be more complicated. From such a viewpoint, the number of voltage applications may preferably be 2 to 7, more preferably 2 to 5.

As each of the above-mentioned rollers (i.e., electrode), it is preferred to use a roller comprising a metal such as copper coated with plating of another metal such as gold and platinum; or a roller comprising an electroconductive elastomer such as rubber. Further, when a roller having a larger diameter is used, or a belt-like member is used instead of the roller as described above, the contact time between the viscous substance and the electrode may be lengthened, whereby the viscous substance may be transferred by using a lower voltage.

In the above-mentioned embodiment as shown in FIGS. 1–3, the adhesiveness of a viscous substance disposed on the cathode side is reduced. However, the adhesiveness of a viscous substance disposed on the anode side may also be reduced depending on the kind or composition of the viscous substance.

In the present invention, there some embodiments may be utilized as follows, with respect to mechanisms wherein a viscous substance is converted from an adhesive state into a non-adhesive state under the application of a voltage.

(1) An embodiment wherein a viscous substance is subjected to electrolysis to generate a gas on the basis of electric conduction due to voltage application, whereby the adhesiveness of the viscous substance is changed.

In such an embodiment, the viscous substance is caused to generate a gas in the neighborhood of one electrode under voltage application, whereby the viscous substance becomes non-adhesive to the electrode due to the gas.

When the viscous substance contains a solvent such as water, alcohol and glycol; or a solvent containing an electrolyte such as sodium chloride and potassium chloride dissolved therein, the viscous substance may be subjected to electrolysis to generate a gas. The electric resistance of the viscous substance may preferably be as low as possible. More specifically, the volume resistivity of the viscous substance may preferably be $10^9$ ohm.cm or below, more preferably $10^4$ ohm.cm or below, particularly preferably $10^2$ ohm.cm or below. If the volume resistivity exceeds $10^9$ ohm.cm, the quantity of electric conduction becomes too small, or a high voltage is required in order to prevent a decrease in the quantity of electric conduction.

For example, the generation of a gas in a hydroxyl (—OH) group-containing solvent based on electrolysis due to electric conduction, or the generation of a gas in water based on electrolysis due to electric conduction may be considered as follows:

On the cathode side:

$$2ROH^- + 2e^- \rightarrow H_2\uparrow + 2RO^-$$

(One mole of hydrogen gas is generated.)

(In the case of water):

$$2H^+ + 2e^- \rightarrow H_2\uparrow$$

(One mole of hydrogen gas is generated.)

On the anode side:

$$2ROH \rightarrow 2RCHO + 2H^+ + 2e^-$$

(In the case of water):

$$2OH^- \rightarrow H_2O + 1/2O_2 + 2e^-$$

(1/2 mole of oxygen gas is generated.)

As shown in the above formulas, the amount of the generated gas is proportional to the amount of electrons ($e^-$), i.e., the magnitude of an electric current, and the gas is generated only on the cathode side (in the case of the hydroxyl group-containing solvent other than water), or the gas is generated on the cathode side in an amount which is two times that of the gas generated on the anode side. In other words, when the difference in the amount of the generated gas is not smaller than a certain value, the viscous substance becomes non-adhesive to either one electrode (e.g., cathode in the case expressed by the above-mentioned formulas).

(2) An embodiment wherein the adhesiveness of a viscous substance is changed on the basis of Coulomb force under voltage application.

In such an embodiment, a viscous substance basically comprising inorganic or organic fine particles and a liquid dispersion medium is used, and the viscous substance is converted from an adhesive state to a non-adhesive state by utilizing a difference in chargeability of the fine particles.

More specifically, in a case where the viscous substance contains negatively chargeable fine particles (i.e., those capable of being easily charged negatively), the viscous substance on the cathode side becomes non-adhesive to the cathode when a voltage is applied to the viscous substance. In a case where the viscous substance contains positively chargeable fine particles (i.e., those capable of being easily charged positively), the viscous substance on the anode side becomes non-adhesive to the anode when a voltage is applied to the viscous substance.

(3) An embodiment wherein the surface of a viscous substance contacting an electrode changes its viscosity or cohesion due to electric conduction based on the application of a voltage, whereby the viscous substance reduces its adhesiveness to the electrode.

Examples of such a viscous substance capable of changing its viscosity or cohesion due to a change in pH value, etc., in the vicinity of an electrode due to electric conduction may include one utilizing a change in the crosslinked structure of a gel comprising a polymer, as described in Japanese Laid-Open Patent Application (KOKAI) No. 30279/1988 (corresponding to U.S. Pat. Application Ser. No. 075,045).

However, in such a case, it is difficult to transfer or convey the whole viscous substance, when the viscous substance shows such a property that its viscosity is remarkably decreased and its cohesion is extremely decreased in the vicinity of one electrode. Accordingly, such a viscous substance is difficult to be used in the present invention. More specifically, it is preferred that the cohesion of the viscous substance is larger than the adhesiveness thereof on one electrode side to which the viscous substance becomes non-adhesive under voltage application.

According to our investigation, it is considered that the adhesiveness change based on the above-mentioned mechanism (1), (2) or (3) is retained for a predetermined period of time, and therefore the viscous substance can be transferred even under intermittent voltage applications.

It is considered that the mechanism by which a viscous substance is converted from an adhesive state to a non-adhesive state under voltage application is any one of the above-mentioned three mechanisms (1), (2) or (3). It is possible that the mechanism of such a conversion is a combination of two or more of the above-mentioned three mechanisms.

In the present invention, with respect to a portion of a layer of viscous substance supplied with a voltage, almost the whole viscous substance layer along the thickness direction may be transferred to a transfer-receiving member such as roller (hereinafter, such a transfer of a viscous substance is referred to as "bulk transfer").

If the viscous substance used in the present invention is a liquid having a low viscosity similar to that of water and alcohol, the cohesive force thereof is weak, whereby it is difficult to obtain a suitable adhesiveness.

More specifically, the viscous substance used in the present invention may preferably satisfy at least one of the following properties.

(1) Adhesiveness

A sample viscous substance is caused to adhere to a stainless steel plate of 1 cm × 1 cm in size coated with platinum plating which is vertically disposed, so that a 1 mm-thick ink layer is formed on the stainless steel plate, and is left standing as it is for 5 sec. in an environment of a temperature of 25° C. and a moisture of 60%. Then, the height of the viscous substance is measured. Through the measurement, the viscous substance in the present invention may preferably be substantially held on the stainless steel plate. More specifically, the above-mentioned height of the viscous substance layer may preferably be 50% or more, more preferably 80% or more, based on the original height thereof.

(2) Adhesiveness under no voltage application

A 2 mm-thick layer of a sample viscous substance is sandwiched between two stainless steel plates each of 1 cm × 1 cm in size coated with platinum plating which are vertically disposed, and the stainless steel plates are separated from each other at a peeling speed of 5 cm/sec under no voltage application. Then, the areas of both plates covered with the viscous substance are respectively measured. Through the measurement, in the viscous substance used in the present invention, the respective plates may preferably show substantially the same adhesion amount of the viscous substance. More specifically, each plate may preferably show an area proportion of 0.7–1.0, in terms of the proportion of the area measured above to the area of the plate which has originally been covered with the above-mentioned 2 mm-thick viscous substance layer.

(3) Adhesiveness under voltage application

A sample viscous substance is applied onto a stainless steel plate of 1 cm × 1 cm coated with platinum plating to form an about 2 mm-thick viscous substance layer, and another stainless steel plate coated with platinum plating having the same size as described above is disposed on the viscous substance layer, and these two stainless steel plates are vertically disposed. Then, a voltage of +30 V is applied between the above-mentioned two stainless steel plates sandwiching the 2 mm-thick viscous substance layer, while one of the stainless steel plates is used as a cathode (earth) and the other is used as an anode. The stainless steel plates are separated from each other at a peeling speed of 5 cm/sec in an environment of a temperature of 25° C. and a moisture of 60%, while applying the voltage in the above-mentioned manner, and then the weight of the viscous substance attached to each of the stainless steel plates is measured. Through the measurement, in the viscous substance used in the present invention, it is preferred that the weight of the viscous substance attached to one electrode (to which a larger amount of the viscous substance is attached) is 800 times or more, more preferably 1000 times or more, that of the viscous substance attached to the other electrode.

(4) Retention of non-adhesiveness

A sample viscous substance is supplied between a pair of stainless steel rollers coated with rhodium plating which have a diameter of 34 mm and a length of 34 mm and are disposed opposite to each other with a clearance of about 150 microns. The two rollers used herein are horizontally disposed so that they are parallel to each other, and are rotated at 600 rpm in a direction counter to each other. In such a case, a somewhat excess of the viscous substance is supplied between the above-mentioned rollers so that the viscous substance may be attached to both rollers to form a uniform layer on the surfaces thereof. At this time, an excess of viscous substance is spontaneously dropped from the both ends of the rollers along with the rotations thereof under no voltage application.

After the viscous substance is uniformly attached to the surfaces of both rollers, a DC voltage of 15 V is applied between the rollers. In such a case, it is preferred that the viscous substance used in the present invention is substantially attached to either one of the above-mentioned rollers for the first time, after two or seven revolutions (more preferably two to five revolutions) of the roller counted from the initiation of the above-mentioned DC voltage application.

As described hereinabove, when a viscous substance contains a solvent capable of being electrolyzed to generate a gas, the change thereof from an adhesive state to a non-adhesive state may occur at an electrode of one side.

In such a case, the solvent may preferably comprise: water, an alcohol such as methanol and ethanol; a solvent having a hydroxyl group such as glycerin, ethylene glycol and propylene glycol; or a solvent containing an electrolyte such as sodium chloride and potassium chloride dissolved therein. The solvent content may preferably be 40–95 wt. parts, more preferably 60–85 wt. parts, per 100 wt. parts of the viscous substance.

When water or an aqueous solvent is used as the solvent, hydrogen gas is liable to be generated at the cathode side. When water and another solvent are mixed, the water content may preferably be 1 wt. part or more, more preferably 5–99 wt. parts, per 100 wt. parts of the viscous substance.

When the adhesiveness of the viscous substance is changed due to Coulomb force, charged or chargeable fine particles may be used as the entirety or a part of the above-mentioned fine particles and may preferably be mixed or kneaded in a liquid dispersion medium as described hereinafter, e.g., by means of a homogenizer, a colloid mill or an ultrasonic dispersing means, whereby charged particles are obtained.

The "charged particle" used herein refers to a particle which has a charge prior to the kneading. The "chargeable particle" refers to a particle which can Examples of the particles to be supplied with a positive charge may include: particles of a metal such as Au, Ag and Cu; particles of a sulfide such as zinc sulfide ZnS, antimony sulfide $Sb_2S_3$, potassium sulfide $K_2S$, calcium sulfide CaS, germanium sulfide GeS, cobalt sulfide CoS, tin sulfide SnS, iron sulfide FeS, copper sulfide $Cu_2S$, manganese sulfide MnS, and molybdenum sulfide $Mo_2S_3$; particles of a silicic acid or salt thereof such as orthosilicic acid $H_4SiO_4$, metasilicic acid $H_2Si_2O_5$, mesortisilicic acid $H_4Si_3O_3$, mesotetrasilicic acid $H_6Si_4O_{11}$; polyamide resin particles; polyamide-imide resin particles; etc.

Examples of the particles to be supplied with a negative charge may include: iron hydroxide particles, aluminum hydroxide particles, fluorinated mica particles, polyethylene particles, motmorillonite particles, fluorine-containing resin particles, etc.

Further, polymer particles containing various charge-controlling agents used as electrophotographic toners (positively chargeable or negatively chargeable) may be used for such a purpose.

The above-mentioned fine particles may generally have an average particle size of 100 microns or smaller, preferably 0.1–20 microns, more preferably 0.1–10 microns. The fine particles may generally be contained in the viscous substance in an amount of 1 wt. part or more, preferably 3–90 wt. parts, more preferably 5–60 wt. parts, per 100 wt. parts of the viscous substance.

Examples of the solvent to be contained in the viscous substance together with the above-mentioned fine particles may include: ethylene glycol, propylene glycol, diethylene glycol, triethylene glycol, tetraethylene glycol, polyethylene glycol (weight-average molecular weight: about 100–1,000), ethylene glycol monomethyl ether, ethylene glycol monoethyl ether, ethylene glycol monobutyl ether, methyl carbitol, ethyl carbitol, butyl carbitol, ethyl carbitol acetate, diethyl carbitol, triethylene glycol monomethyl ether, triethylene glycol monoethyl ether, propylene glycol monomethyl ether, glycerin, triethanolamine, formamide dimethylformamide, dimethylsulfoxide N-methyl-2-pyrrolidone, 1,3-dimethylimidazolidinone, N-methylacetamide, ethylene carbonate, acetamide, succinonitrile, dimethylsulfoxide, sulfolane, furfuryl alcohol, N,N-dimethylformamide, 2-ethoxyethanol, hexamethylphosphoric triamide, 2-nitropropane, nitroethane, γ-butyrolactone, propylene carbonate 1,2,6-hexanetriol, dipropylene glycol, hexylene glycol, etc. These compounds may be used singly or as a mixture of two or more species as desired. The solvent may preferably be contained in an amount of 40–95 wt. parts, more preferably 60–85 wt. parts, per 100 wt. parts of the viscous substance.

Even in the case of the viscous substance capable of generating a gas due to electrolysis, it can contain fine particles such as silica, carbon fluoride, titanium oxide or carbon black, in addition to those as described hereinabove.

In a preferred embodiment of the viscous substance usable in the present invention, in view of the viscoelastic characteristic of the viscous substance, the entirety or a part of the fine particles comprise swelling particles (i.e., particles capable of being swelled) which are capable of retaining the above-mentioned solvent therein.

The "swelling particles" used herein refers to particles having a property such that when they are mixed with a solvent, they incorporate the solvent in their internal structure (e.g., between crystal layers) to be swelled.

More specifically, the swelling particles used in the present invention may preferably show "liquid absorption" as defined below, in the range of 5 ml - 1000 ml, more preferably 50 ml - 500 ml. The liquid adsorption may be measured in the following manner.

A liquid dispersion medium or solvent such as water used in the viscous substance is gradually added to 1 g of powder of the above-mentioned swelling particles while kneading the resultant mixture. The state of the powder is observed and an amount (or a range of amount) of the liquid dispersion medium is found in which the powder is converted from a dispersed state into the state of a mass, and the mass substantially retains the liquid dispersion medium. At this time, the amount of the liquid dispersion medium added to the powder is the "liquid absorption".

Generally speaking, the liquid absorption of the swelling particles may remarkably be decreased when a salt is dissolved in the liquid dispersion medium. Accordingly, if the liquid adsorption as defined above is less than 5 ml, the effect thereof is small.

Examples of such swelling particles may include: fluorinated mica such as Na-montmorillonite, Ca-montmorillonite, 3-octahedral synthetic smectites, Na-hectorite, Li-hectorite, Na-taeniolite, Na-tetrasilicic mica and Li-taeniolite; synthetic mica, silica, etc.

The above-mentioned fluorinated mica may be represented by the following general formula (1):

$$W_{1\text{-}1/3}(X,Y)_{2.5\text{-}3}(Z_4O_{10})F_2 \quad (1),$$

wherein W denotes Na or Li; X and Y respectively denote an ion having a coordination number of 6, such as $Mg^{2+}$, $Fe^{2+}$, $Ni^{2}$, $Mn^{2+}$, $Al^{3+}$, and $Li^{+}$; Z denotes a positive ion having a coordination number of 4 such as $Al^{3+}$, $Si^{4+}$, $Ge^{4+}$, $Fe^{3+}$, $B^{3+}$ or a combination of these including, e.g., $(Al^{3+}/Si^{4+})$.

The swelling particles, in their dry state, may preferably have an average particle size of 0.1–20 microns, more preferably 0.8–15 microns, particularly preferably 0.8–8 microns. The swelling particle content can be the same as described above with respect to the fine particles, but may more preferably be 8–60 wt. parts per 100 wt. parts of the viscous substance. It is also preferred to use swelling particles having a charge on their surfaces.

In an embodiment of the present invention, in order to control the viscosity of the viscous substance, a polymer soluble in the above-mentioned solvent may be contained in the viscous substance in an amount of 1–90 wt. parts, more preferably 1–50 wt. parts, particularly preferably 1–20 wt. parts, per 100 wt. parts of the viscous substance.

Examples of such polymers include: plant polymers, such as guar gum, locust bean gum, gum arabic, tragacanth, carrageenah, pectin, mannan, and starch; microorganism polymers, such as xanthane gum, dextrin, succinoglucan, and curdran; animal polymers, such as gelatin, casein, albumin, and collagen; cellulose polymers such as methyl cellulose, ethyl cellulose, and hydroxyethyl cellulose; starch polymers, such as soluble starch, carboxymethyl starch, and methyl starch; alginic acid polymers, such as propylene glycol alginate, and alginic acid salts; other semisynthetic polymers, such as derivatives of polysaccharides; vinyl polymers, such as polyvinyl alcohol, polyvinylpyrolidone, polyvinyl methyl ether, carboxyvinyl polymer, and sodium polyacrylate; and other synthetic polymers, such as polyethylene glycol, ethylene oxide-propylene oxide block copolymer; alkyl resin, phenolic resin, epoxy resin, aminoalkyl resin, polyester resin, polyurethane resin, acrylic resin, polyamide resin, polyamide-imide resin, polyester-imide resin, and silicone resin; etc. These polymers may be used singly or in mixture of two or more species, as desired. Further, grease such as silicone grease, and liquid polymer such as polybutene can also be used.

In order to obtain the viscous substance according to the present invention, a solvent and fine particles as mentioned above may for example be mixed in an ordinary manner.

Next, a viscous substance is described in which adhesiveness is changed by the above-mentioned mechanism (3).

The viscous substance used in such an embodiment may comprise a crosslinked substance (inclusive of polyelectrolyte) impregnated with a liquid dispersion medium.

Herein, the "crosslinked substance" refers to a single substance which per se can assume a crosslinked structure, or a mixture of a substance capable of assuming a crosslinked structure with the aid of an additive such as a crosslinking agent for providing an inorganic ion such as borate ion, and the additive. Further, the term "crosslinked structure" refers to a three-dimensional structure having a crosslinkage or crosslinking bond.

Examples of the crosslinked substance include: plant polymers, such as guar gum, locust bean gum, gum arabic, tragacanth, carrageenah, pectin, mannan, and starch; microorganism polymers, such as xanthane gum, dextrin, succinoglucan, and curdran; animal polymers, such as gelatin, casein, albumin, and collagen; cellulose polymers such as methyl cellulose, ethyl cellulose, and hydroxyethyl cellulose; starch polymers, such as soluble starch, carboxymethyl starch, and methyl starch; alginic acid polymers, such as propylene glycol alginate, and alginic acid salts; other semisynthetic polymers, such as derivatives of polysaccharides; vinyl polymers, such as polyvinyl alcohol, polyvinylpyrolidone, polyvinyl methyl ether, carboxyvinyl polymer, and sodium polyacrylate; and other synthetic polymers, such as polyethylene glycol, ethylene oxide-propylene oxide block copolymer. These polymers may be used singly or in mixture of two or more species, as desired.

In the present invention, it is preferred to use a viscous substance containing the crosslinked substance in a proportion of 0.2–50 wt. parts, particularly 0.5–30 wt. parts, with respect to 100 wt. parts of the liquid dispersion medium.

When an oil such as mineral oil or an organic solvent such as toluene is used as the liquid dispersion medium, the crosslinked substance may be composed of one compound or a mixture of two or more compounds selected from metallic soaps inclusive of metal stearates, such as aluminum stearate, magnesium stearate, and zinc stearate, and, similar metal salts of other fatty acids, such as palmitic acid, myristic acid, and lauric acid; or organic substances such as hydroxypropyl cellulose derivative, dibenzylidene-D-sorbitol, sucrose fatty acid esters, and dextrin fatty acid esters.

If the viscous substance used in the present invention is a liquid having a low viscosity similar to that of water and alcohol, the cohesive force thereof is weak, whereby it is difficult to effect the above-mentioned bulk transfer. On the other hand, if the viscous substance is a perfect solid, it is difficult to obtain a suitable adhesiveness. From such a viewpoint, it is preferred to use a viscous substance having a viscoelasticity as a non-Newtonian fluid, in order to effect suitable bulk transfer.

While the viscosity (or viscosity coefficient) of the viscous substance as a non-Newtonian fluid may change depending on shear rate, the viscosity may preferably be $10^4$ to $10^{11}$ poise (more preferably $10^6$ to $10^9$ poise) at a shear rate of 0.1 rad/s used in the measurement thereof; and the viscosity may preferably be $10^2$ to $10^9$ poise (more preferably $10^4$ to $10^7$) at a shear rate of 10 rad/s.

In the present invention, the above-mentioned viscosity may be measured by means of Mechanical Spectrometer RMS-800 (mfd. by Rheometrics Inc.) equipped with a 25 mm-diameter cone (cone angle =0.1 radian) at 25° C.

Hereinbelow, there is described a recording method utilizing the method of transferring a viscous substance as described above.

Figure 4:
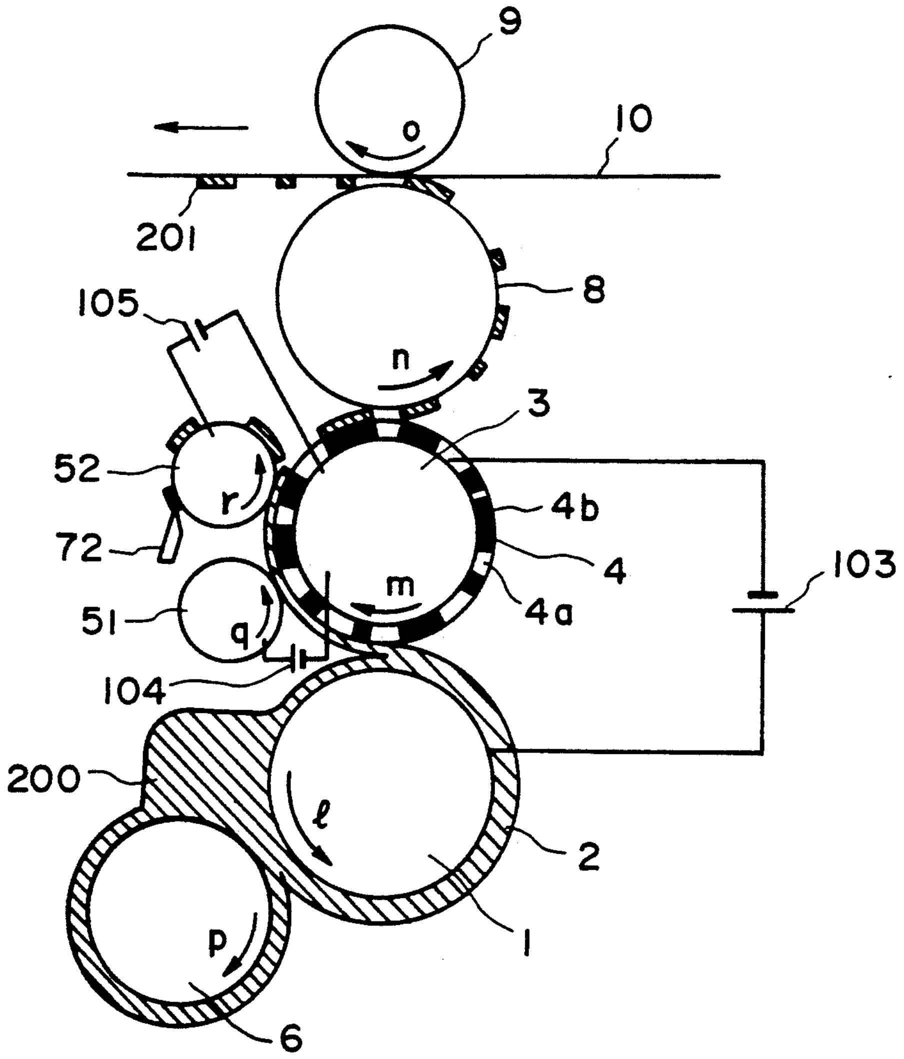
FIG. 4 is a schematic side sectional view showing an embodiment of the image forming apparatus according to the present invention.

Referring to FIG. 4, an ink-carrying roller 1 is a cylindrical member rotating in the arrow 1 direction. The roller 1 may preferably comprise an electroconductive material such as aluminum, copper and stainless steel. Onto the cylindrical ink-carrying surface of the roller 1, an ink 2 is supplied by means of a coating roller 6 rotating in the arrow p direction to be formed into a layer having a uniform thickness.

The ink 1 used herein may comprise a viscous substance as described above, and a colorant comprising a dye or pigment contained therein which is generally used in the field of printing or recording, such as carbon black, as desired. When the ink contains a colorant, the colorant content may preferably be 0.1–40 wt. parts, more preferably 1–20 wt. parts, per 100 wt. parts of the ink. Instead of or in combination with the colorant, a color-forming compound capable of generating a color under voltage application can be contained in the ink. It is also possible to cause the above-mentioned fine particles per se to function as a colorant.

The cylindrical ink-carrying surface of the roller 1 may be composed of any material, as far as it is possible to form a desired layer of the ink 2 when it is rotated in the arrow 1 direction. More specifically, the roller surface may preferably be composed of a conductive material such as metal including stainless steel. The ink-carrying roller 1 is connected to one of the terminals of a DC power supply 103.

In contact with the ink layer 2 disposed on the ink-carrying roller 1, a printing plate 4 wound about a plate roller 3 is disposed. The plate roller 3 rotates in the arrow m direction which is counter to that of the roller 1. The printing plate 4 may for example comprise a substrate 4a comprising an electroconductive material such as metal, and a desired pattern 4b disposed thereon comprising an insulating material, as shown in FIG. 5.

Figure 5:
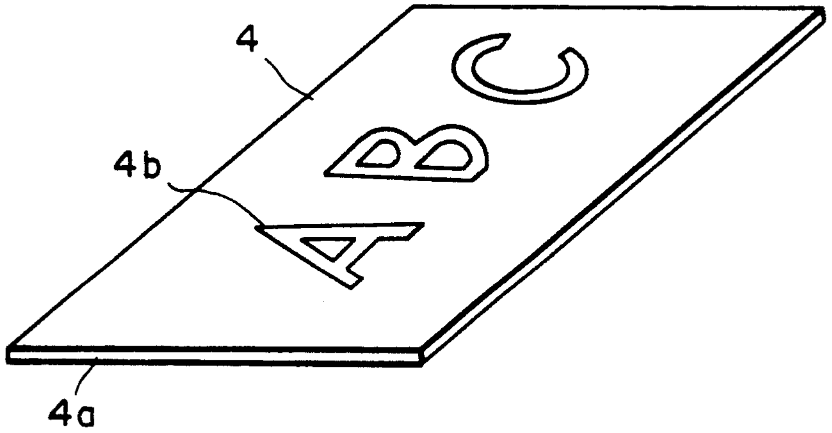
FIG. 5 is a schematic perspective view showing an embodiment of the printing plate usable in the present invention.

Referring to FIG. 5, the material constituting the substrate 4a may include: metals such as aluminum, copper, stainless steel, platinum, gold, chromium, nickel, phosphor bronze, and carbon; electroconductive polymers; and dispersions obtained by dispersing metal filler, etc., in various polymers. The material constituting the pattern 4b may include: materials for thermal transfer recording mainly comprising waxes or resins, electrophotographic toners; natural or synthetic polymers such as vinyl polymer.

In such an arrangement shown in FIG. 4, a voltage is applied between the printing plate 4 and the ink-carrying roller 1 by means of the power supply 103; a voltage is applied between the ink-carrying roller 1 and an auxiliary roller (auxiliary electrode) 51, by means of a power supply 104; and a voltage is applied between the ink-carrying roller 1 and an auxiliary roller (auxiliary electrode) 52, by means of a power supply 105 so that the printing plate becomes a cathode and the ink-carrying roller 1, and auxiliary rollers 51 and 52 become anodes. As a result, in the same manner as in the embodiment shown in FIGS. 1 to 3, the adhesiveness of the ink 2 contacting the electroconductive portion 4a of the printing plate 4 is reduced at a position at which the ink-carrying roller 1 confronts the auxiliary roller 52, and the ink 2 disposed on the electroconductive portion 4a of the printing plate 4 is transferred to the auxiliary roller 52 side, whereby an ink pattern is formed on the basis of the ink 2 attached to the insulating portion 4b of the printing plate 4.

Incidentally, while the printing plate 4 is a cathode and the ink-carrying roller 1, and auxiliary rollers 51 and 52 are anodes in FIG. 4, but the printing plate 4 may be an anode and the ink-carrying roller 1, and auxiliary rollers 51 and 52 may be cathodes depending on the property or state of an ink used in combination therewith. In another embodiment, it is sufficient to dispose one auxiliary roller. In still another embodiment, three or more auxiliary rollers may be provided.

In the present invention, it is preferred that the voltage from the power supplies 103, 104 and 105 is applied between the rotation axis of the plate roller 3, and those of the ink-carrying roller 1, and auxiliary rollers 51 and 52.

The thickness of the layer of the ink 2 formed on the ink-carrying roller 1 can vary depending on various factors including the gap between the ink-carrying roller 1 and the coating roller 6, the fluidity or viscosity of the ink 2, the surface material and roughness thereof of the ink-carrying roller 1, and the rotational speed of the roller 1, but may preferably be about 0.001-1 mm as measured at an ink transfer position where the roller 1 is disposed opposite to the pattern plate 4 on the plate roller 3.

If the layer thickness of the ink 2 is below 0.001 mm, it is difficult to form a uniform ink layer on the ink-carrying roller 1. On the other hand, if the ink layer thickness exceeds 1 mm, it becomes difficult to convey the ink 2 while keeping a uniform peripheral speed of the surface portion on the side contacting the printing plate 4, and further it becomes difficult to pass a current between the pattern plate 4 and the ink-carrying roller 1.

The ink 2 attached to the voltage application roller 52 is scraped off with an ink-scraping blade 72 comprising a plastic or metal, and the thus scraped ink is returned to an ink reservoir 200 to be reused.

The ink pattern formed on the printing plate 4 is then transferred to a blanket cylinder 8, as an intermediate transfer medium, which rotates in the arrow n direction while contacting the printing plate 4 under pressure. Further, the ink pattern disposed on the blanket cylinder 8 is transferred to a recording medium (or a medium to be recorded) 10 such as a sheet of paper, cloth or metal, passing between the blanket cylinder 8 and an impression cylinder 9, as a pressure-applying means, which rotates in the arrow o direction while contacting the blanket cylinder 8 under pressure, whereby an image 201 corresponding to the above-mentioned ink pattern is formed on the recording medium 10.

It is also possible that the ink pattern formed on the printing plate 4 is directly transferred to the recording medium 10 in some cases without providing the blanket cylinder 8 as an intermediate transfer medium. However, when the blanket cylinder 5 is provided, the printing plate 4 may be prevented from wearing or deteriorating on the basis of the material constituting the blanket cylinder 8, and an image 201 having the same pattern as that of the printing plate 4 may be obtained on the recording medium 10.

In the above-mentioned embodiment shown in FIG. 4, the printing plate 4 is wound about the cylindrical plate roller 3 and used for recording. However, even when the printing plate 4 in a flat plate form is used as such, it is also possible to form an ink pattern on the printing plate. More specifically, as shown in FIG. 6, when a printing plate 40 in a flat plate form and a plurality of rollers 300, 301 and 302 are used, an ink pattern (or image) may be formed on the flat printing plate 40.

The flat printing plate 40 used herein may comprise a substrate 40a comprising an electroconductive material, and a desired pattern 40b disposed thereon comprising an insulating material, in the same manner as in the printing plate shown in FIG. 5.

One surface of the flat printing plate 40 provided with the pattern 40b is entirely coated with a layer of an ink 2 having a substantially uniform thickness The rollers 300, 301 and 302 are rotatably mounted on an insulating frame 303 so that these rollers are parallel to each other. In FIG. 6, voltage application means 304, 305 and 306 are provided so that they apply a voltage between the rollers 300, 301 and 302, and the printing plate 40, respectively. In FIG. 6, the printing plate is a cathode and the rollers 300, 301 and 302 are anodes, but the printing plate 40 can be an anode in some cases depending on the kind of an ink used in combination therewith.

Figure 6:
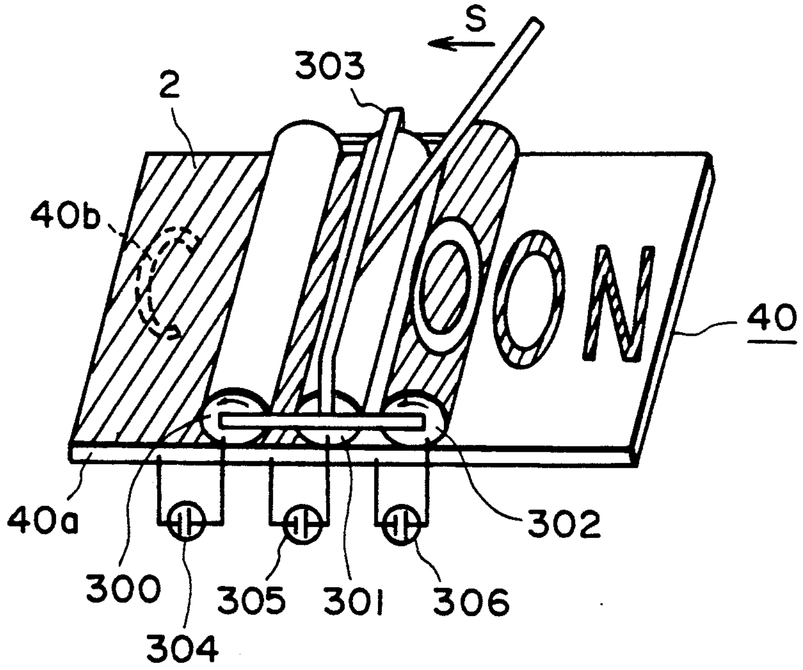
FIG. 6 is a schematic perspective showing an image forming apparatus using a flat-type printing plate.

Referring to FIG. 6, when the rollers 300, 301 and 302 are moved in the arrow s direction in contact with the printing plate 40, the total amount of charge passing through the ink 2 exceeds a predetermined amount at a position where the roller 302 confronts the printing plate 40, whereby the ink 2 disposed on the electroconductive portion of the printing plate 40 is transferred to the roller 302. As a result, the ink 2 selectively remains on the insulating portion of the printing plate 40, and a pattern or image of the ink 2 is formed on the printing plate 40. The ink pattern thus formed on the printing plate 40 may further be transferred to a transfer-receiving medium such as paper, as desired As described hereinabove, the image forming method according to the present invention utilizes a phenomenon such that when a specific ink is supplied between an electrode (or printing plate) having a desired insulating pattern, and a counter electrode disposed opposite to such an electrode, and a DC voltage is applied plural times between at least the above-mentioned one pair of electrode, the adhesiveness of the ink is changed corresponding to the pattern of the electrode.

Hereinbelow, the present invention will be explained in more detail with reference to Examples.

EXAMPLE 1

| | |
|---|---|
| Glycerin | 37 wt. parts |
| $H_2O$ | 16 wt. parts |
| Lithium taeniolite | 47 wt. parts |
| 20%-ethanol solution of n-butyl p-hydroxybenzoate (ethanol content = 80 wt. %) | 0.01 wt. part |

The above-mentioned materials were mixed to prepare a viscous substance as a gray colloid sol in the form of an amorphous solid having a volume resistivity of 2050 ohm.cm.

The viscous substance prepared above was transferred by using a method as shown in FIGS. 1-3.

In the apparatus as shown in FIG. 1, each of the first roller 11 to the sixth roller 16 comprised a stainless steel roller of which peripheral surface was coated with platinum plating, and had a diameter of 34 mm and a width of 8 cm. The clearance between each pair of adjacent rollers (of the first roller 11 to sixth roller 16) was set to about 0.1 mm at minimum, and each of the first roller 11 to the sixth roller 16 was rotated at 600 rpm.

Further, each of the auxiliary rollers 110, 111, 120, 121, 130, 131, 140, 141, 150 and 151 comprised a stainless steel roller having a diameter of 17 mm and a width of 8 cm of which peripheral surface was coated with platinum plating. All of these auxiliary rollers were rotated at 1,200 rpm.

First, the viscous substance 100 was supplied to the clearance between the first roller 11 rotating in the arrow A direction and the second roller 12 rotating in the arrow B direction, whereby the viscous substance 100 was attached to both of the first and second rollers 11 and 12. Then, a power supplies 21, 210 and 211 were turned on by means of a power supply controller 31 so that a DC voltage of 15 V was applied between the first roller 11 as a cathode, and the second roller 12, and auxiliary rollers 110 and 111 as anodes. As a result, the viscous substance 100 was transferred onto the second roller 12.

After the entirety of the viscous substance 100 was transferred to the second roller 12, a power supplies 22, 220 and 221 were turned on by means of the power supply controller 31 so that a DC voltage of 15 V was applied between the second roller 12 as a cathode and the third roller 13, and auxiliary rollers 120 and 121 as anodes. As a result, the viscous substance 3 was transferred onto the third roller 13.

The above-mentioned procedure was repeated while each set of power supplies 23, 230 and 231; 24, 240 and 241; and 25, 250 and 251 was controlled by means of the power supply controller 31 so that the viscous substance 100 was successively transferred from the third roller 13 to the forth roller 14, the fifth roller 15 and the sixth roller 16 in the same manner as described above, whereby the entirety of the viscous substance 100 was finally transferred to the sixth roller 16. After the viscous substance 100 was transferred to the sixth roller 16, it was found that substantially no viscous substance was attached to each of the first roller 11 to the fifth roller 15. The DC voltages applied from the above-mentioned power supplies 21 to 251 were all set to 15 V.

COMPARATIVE EXAMPLE 1

Transfer of the viscous substance 100 was attempted in the same manner as in Example 1 except that voltage applications based on the auxiliary rollers 110, 111, 120, 121, 130, 131, 140, 141, 150 and 151 were not conducted. As a result, a considerable amount of the viscous substance 100 remained on each of first roller 11 to fifth roller 15, whereby the viscous substance 100 was transferred to the sixth roller 16 with considerable loss thereof.

However, when the first roller 11 to the sixth roller 16 were rotated so that their rotation speeds were 1/6 of the times used in Example 1, the viscous substance 100 was transferred to the sixth roller 16 in the same manner as in Example 1.

EXAMPLE 2

| | |
|---|---|
| Glycerin | 37.3 wt. parts |
| Water | 15.1 wt. parts |
| Lithium taeniolite ($LiMg_2Li(Si_4O_{10})F_2$) | 46.4 wt. parts |
| Cyan colorant (Supranol Cyane 7BF, mfd. by Bayer, West Germany) | 1.2 wt. parts |
| Antiseptic (20% ethanol solution of n-butyl p-hydroxybenzoate, ethanol content = 80 wt. %) | 0.01 wt. part |

The above-mentioned materials were mixed to prepare a colloid sol ink in the form of an amorphous solid having a cyan color and a volume resistivity of 1953 ohm.cm.

Then, image formation was effected by means of a printing apparatus as shown in FIG. 4, which used an ink-carrying roller 1 comprising a cylindrical roller of 34 mm in diameter having a stainless steel surface coated with platinum plating (surface roughness: 1S) and a plate roller 3 comprising an iron cylindrical roller of 34 mm in diameter having a surface coated with hard chromium plating. In this apparatus, a printing plate 4 comprising an aluminum plate which had been subjected to patterning by using a vinyl-type resin was wound about the plate roller 3, and the above-mentioned ink material was disposed between the ink-carrying roller 1 and a coating roller 6.

The ink-carrying roller 1 was rotated in the arrow 1 direction at a peripheral speed of 1000 mm/sec, and the gap between the ink-carrying roller 1 and the coating roller 6 comprising a cylindrical roller having a teflon rubber surface and rotating in the arrow p direction at a peripheral speed of 1000 mm/sec was controlled so that a 0.1 mm-thick ink layer was formed on the ink-carrying roller 1. The plate roller 3 was rotated in the arrow m direction at a peripheral speed of 1000 mm/sec in contact with the ink layer formed on the ink-carrying roller 1.

When the printing operation was conducted while a DC voltage of 15 V was applied from the DC voltage supply 103 between the ink-carrying roller 1 as an anode and the plate roller 3 as a cathode; auxiliary rollers 51 and 52 comprising 17 mm-diameter stainless steel rollers coated with platinum plating were rotated at a peripheral speed of 1000 mm/sec in contact with the ink 2 disposed on the plate roller 3; and a DC voltage of 15 V was applied between the plate roller 3 as a cathode and the auxiliary rollers 51 and 52 as anodes. As a result, the entire ink 2 disposed on the electroconductive portion 4a of the printing plate 4 was transferred to the auxiliary roller 52.

The resultant pattern of the ink 2 remaining on the printing plate 4 was then transferred to a blanket roller 8 and further transferred to a recording medium 10, whereby a clear image 201 was obtained on the recording medium 10.

COMPARATIVE EXAMPLE 2

Image formation was attempted in the same manner as in Example 2 except that no voltage was applied between the auxiliary rollers 51 and 52, and the plate roller 3. As a result, transfer of the ink 2 disposed on the electroconductive portion 4a of the plate 4 did not occur, thereby to provide no image.

However, when the respective rollers were, rotated so that their rotation speeds were 1/10 the times of those used in Example 2, the ink 2 was selectively transferred from the ink-carrying roller 1 to the insulating portion 4b of the printing plate 4, whereby an image was obtained in the same manner as in Example 2.

What is claimed is:

1. A method for transferring a viscous substance, comprising the steps of:
   (a) providing a viscous substance which changes in adhesiveness corresponding to a polarity of a voltage applied thereto;
   (b) disposing the viscous substance between a first electrode and a second electrode; and
   (c) applying a voltage to a particular part of the viscous substance plural times before each transfer of said particular part of said viscous substance, thereby to reduce the adhesiveness of the viscous substance to the first electrode.

2. A method according to claim 1, wherein a voltage is applied to the viscous substance plural times by means of the first and second electrodes, and a first auxiliary electrode in the step (c).

3. A method according to claim 2, wherein each of the first and second electrodes and the first auxiliary electrode comprises a roller.

4. A method according to claim 1, which comprises the steps of:
   (d) transferring the viscous substance disposed on the first electrode to the second electrode; and
   (e) applying a voltage plural times to a particular part of the viscous substance disposed on the second electrode, thereby to reduce the adhesiveness of the viscous substance to the second electrode.

5. A method according to claim 4, wherein a voltage is applied to the viscous substance plural times by means of the first and second electrodes and a first auxiliary electrode in the step (c), and a voltage is applied to the viscous substance plural times by means of the second electrode, a third electrode and a second auxiliary electrode in the step (e).

6. A method according to claim 5, wherein each of the first, second and third electrodes and the first and second auxiliary electrodes comprises a roller.

7. A method according to claim 4, wherein the steps (d) and (e) are repeated so that the viscous substance is transferred to a predetermined electrode.

8. An image forming method comprising the steps of:
   providing a recording material which changes in adhesiveness corresponding to a polarity of a voltage applied thereto;
   supplying the recording material between a pair of electrodes at least one of which has a pattern comprising an electroconductive portion and an insulating portion; and
   applying a voltage plural times to a particular part of the recording material, thereby to attach the recording material to the electrode comprising said pattern.

9. A method according to claim 8, wherein a voltage is applied to the recording material plural times by means of the pair of electrodes and at least one auxiliary electrode.

10. A method according to claim 8, which further comprises a step of transferring the recording material attached to the electrode comprising said pattern to a transfer-receiving medium.

11. A method according to claim 8, wherein the electrode comprising said pattern is a flat printing plate.

12. An image forming apparatus, comprising:
   a pair of electrodes at least one of which has a pattern comprising an electroconductive portion and an insulating portions;
   at least one auxiliary electrode disposed opposite to the electrode comprising said pattern;
   means for supplying a recording material between the pair of electrodes;
   means for applying a voltage between the auxiliary electrode and the electrode comprising said pattern; and
   pressure application means for transferring to a transfer-receiving medium the recording material attached to the electrode comprising said pattern thereof under application of said voltage.

* * * * *

UNITED STATES PATENT AND TRADEMARK OFFICE

CERTIFICATE OF CORRECTION

PATENT NO. : 5,151,712

DATED : September 29, 1992

INVENTOR(S) : KOHZOH ARAHARA, ET AL.

It is certified that error appears in the above-identified patent and that said Letters Patent is hereby corrected as shown below:

COLUMN 1

Line 12, "pudding" should read --puddling--.
Line 22, "si" should read --is--.
Line 34, "abandoned." should read --abandoned).--.
Line 38, "20, 1990." should read --20, 1990).--.

COLUMN 2

Line 49, "perspective" should read --perspective view--.
Line 56, "substance reduces" should read --substance by means of a pair of electrodes, the viscous substance reduces--.

COLUMN 4

Line 49, "the" (third occurrence) should be deleted.

COLUMN 8

Line 25, "more," should read --more, than--.

COLUMN 9

Line 15, "can" should read --can easily be changed by triboelectrification.--.

COLUMN 13

Line 36, "but" should be deleted.

UNITED STATES PATENT AND TRADEMARK OFFICE

CERTIFICATE OF CORRECTION

PATENT NO. : 5,151,712

DATED : September 29, 1992

INVENTOR(S) : KOHZOH ARAHARA, ET AL.

It is certified that error appears in the above-identified patent and that said Letters Patent is hereby corrected as shown below:

COLUMN 14

Line 42, "thickness" should read --thickness.--.
Line 64, "desired" should read --desired.--.

COLUMN 17

Line 21, "were," should read --were--.

COLUMN 18

Line 41, "portions;" should read --portion;--.

Signed and Sealed this

Twenty-second Day of March, 1994

Attest:

BRUCE LEHMAN

Attesting Officer

Commissioner of Patents and Trademarks